US012654496B2

(12) United States Patent
Bélanger et al.

(10) Patent No.: US 12,654,496 B2
(45) Date of Patent: Jun. 16, 2026

---

(54) RUN FLAT SYSTEM HAVING A SPRING SUSPENSION

(71) Applicant: Hutchinson S.A., Paris (FR)

(72) Inventors: Germain Bélanger, Saint-Germain-de-Grantham (CA); Derek Harvey, Montréal (CA); Martin Levesque, Montréal (CA); Larry W. Stuck, Amherst, NY (US); Lars Johan Resare, Ewing, NJ (US); Peter Kenneth Hobe, Levittown, PA (US); Kevin Buck, Philadelphia, PA (US); Jason Scala, Moorestown, NJ (US)

(73) Assignee: Hutchinson S.A., Paris (FR)

( * ) Notice: Subject to any disclaimer, the term of this patent is extended or adjusted under 35 U.S.C. 154(b) by 88 days.

(21) Appl. No.: 18/534,248

(22) Filed: Dec. 8, 2023

(65) Prior Publication Data

US 2024/0316996 A1      Sep. 26, 2024

Related U.S. Application Data

(60) Provisional application No. 63/386,574, filed on Dec. 8, 2022.

(51) Int. Cl.
*B60C 17/04*      (2006.01)
*B60C 17/06*      (2006.01)

(52) U.S. Cl.
CPC .......... *B60C 17/061* (2013.01); *B60C 17/041* (2013.01); *B60C 2017/068* (2013.01)

(58) Field of Classification Search
CPC ............................. B60C 17/04; B60C 17/041
See application file for complete search history.

(56) References Cited

U.S. PATENT DOCUMENTS

| | | | |
|---|---|---|---|
| 4,163,466 | A | 8/1979 | Watts |
| 9,108,470 | B2 | 8/2015 | Tercha et al. |
| 2011/0126954 | A1 | 6/2011 | Glazebrook |
| 2019/0375239 | A1 | 12/2019 | Thompson |
| 2021/0039431 | A1 | 2/2021 | Long |
| 2021/0138847 | A1 | 5/2021 | Lim |

(Continued)

FOREIGN PATENT DOCUMENTS

| | | |
|---|---|---|
| CA | 2865520 A1 | 9/2013 |
| DE | 1950530 U | 11/1966 |
| EP | 1541384 B1 | 6/2005 |

(Continued)

*Primary Examiner* — Justin R Fischer
(74) *Attorney, Agent, or Firm* — The Webb Law Firm

(57)      ABSTRACT

A run flat device configured to be fitted to a tubeless mounted assembly for a motor vehicle, which includes a wheel rim and a tire cover including beads mounted against edges of the rim, the run flat device including: an annular supporting structure which is configured to be mounted around the rim so as to support the cover following a drop in inflating pressure inside the mounted assembly, including: three composite spring segments forming sectors in an arc of a circle assembled circumferentially around the rim forming the annular supporting structure by means of transverse pins whose shape geometry is asymmetrical; and an arrangement for locking the beads against the edges which are configured to connect the annular supporting structure to these beads.

19 Claims, 17 Drawing Sheets

1

(56)    References Cited

U.S. PATENT DOCUMENTS

2021/0188008  A1      6/2021   Thompson

FOREIGN PATENT DOCUMENTS

| | | | | | |
|---|---|---|---|---|---|
| EP | 2658733 | B1 | 5/2017 | | |
| GB | 2575889 | A | 1/2020 | | |
| WO | WO-0187646 | A1 * | 11/2001 | ............ | B60B 21/04 |
| WO | 2005044597 | A1 | 5/2005 | | |
| WO | 2010020744 | A1 | 2/2010 | | |
| WO | 2018112650 | A1 | 6/2018 | | |

* cited by examiner

18

500

600

800

700

900

950

RUN FLAT SYSTEM HAVING A SPRING SUSPENSION

CROSS-REFERENCE TO RELATED APPLICATIONS

The present application claims priority to U.S. Provisional Patent Application No. 63/386,574, filed Dec. 8, 2022, the content of which is incorporated herein by reference in its entirety.

BACKGROUND OF THE INVENTION

Field of the Invention

The present invention relates to a light weight flat-running device designed to be fitted to a tubeless mounted assembly for a motor vehicle and such a mounted wheel assembly incorporating this device, making it possible to travel a considerable distance at relatively high speed when the mounted assembly is partially or totally deflated. This flat-running device is able to be used notably for fitment to a military vehicle designed to travel over all types of terrains including sandy terrains.

Description of Related Art

Run flat devices are designed to provide for flat tire mobility for pneumatic tires used on automobiles, trucks, commercial vehicles, military vehicles and the like. A run flat device is commonly installed in a "well portion" of a wheel. Many applications, particularly for military vehicles, require run flat devices to be light weight and capable of supporting heavy loads. To meet these objectives, it is known to utilize a relatively hard or noncompliant material for the run flat device. The noncompliant material will typically have a durometer harder than the pneumatic tire. The tire durometer typically varies from about 70 Shore A for passenger vehicles to about 50 Shore D for truck size vehicles. Accordingly, it will be appreciated that the quantitative meaning of the terms compliant and noncompliant, as used herein, can vary depending on the specific vehicle application.

The relatively hard or noncompliant material of the run flat device provides for continued operation of a vehicle after a tire blow out, reduced tire pressure or other tire damage. In such situations, however, the run flat device can impact excessively against an interior surface of the tire, and the applied stress between the run flat device and the interior surface of the tire can lead to premature tire liner failure. Similarly, when operating a vehicle on rough terrain, a user often partially deflates the tires of the vehicle to provide better traction and cushion the ride. In this deflated state, the run flat devices must support the vehicle while maintaining contact with the tires. A failure to do so leads to a lack of traction and immobile operation of the vehicle.

The known flat-running devices usually consist of a supporting ring mounted with clearance around a wheel rim inside a tire casing. This ring, because of its width at its base, exerts a force pressing the casing onto the rim. Sometimes used are rigid devices in several sectors that are attached in twos. Thus, document EP-A-1 541 384 in the name of the Applicant presents a flat-running device for a mounted assembly with a rim with several portions of the bolted type comprising, on the one hand, a supporting ring of the hollow type designed to be mounted around the rim and divided into at least two ring sectors mounted independently of one another and, on the other hand, means for locking the beads of the casing against the rim edges that are designed to connect the ring sectors to these beads, for the purpose of ensuring the driving function of the mounted assembly in the event of reduced or zero pressure in the latter.

A major drawback of the known run flat devices lies notably in the rigid character of the attachment location sectors as well as the weight of the devices. Currently, run flat devices use the elastomeric properties of rubber or rubber like materials. However, such materials are dense and have increased weight properties resulting in a heavy runflat.

Therefore, there is a current need for a run flat system which is relatively light in weight, capable of supporting heavy vehicle loads, and sufficiently compliant to mitigate a lack of vehicle operation.

SUMMARY OF THE INVENTION

In one example of the present disclosure, a run flat device intended to be fitted to a tubeless mounted assembly for a motor vehicle, which comprises a wheel rim and a tire cover comprising beads mounted against edges of the rim, the run flat device comprising an annular supporting structure which is configured to be mounted around the rim so as to support the cover following a drop in inflating pressure inside the mounted assembly, comprising: at least one composite spring-type segment forming an arc of a circle assembled circumferentially around the rim forming the annular supporting structure; and an arrangement for locking the beads against the edges which are configured to connect the annular supporting structure to these beads.

In another example of the present disclosure the composite spring-type segment further comprises a plurality of semi-elliptical-shaped springs, shaped for the incorporation of the plurality of semi-elliptical-shaped springs to be fixed to an inner surface the composite spring-type segment, wherein the plurality of semi-elliptical-shaped springs are formed in tension and contact one another when a drop in inflating pressure inside the mounted assembly occurs.

In another example of the present disclosure the annular supporting structure further comprises an end-to-end assembly of the composite spring-type segments allowing a uniform stress distribution in tension over the entire width of the run flat.

In another example of the present disclosure the composite spring-type segment further comprises an extended end configured to attach to one of the plurality of semi-elliptical-shaped springs for the end-to-end assembly.

In another example of the present disclosure one of the plurality of semi-elliptical-shaped springs are attached to two composite spring-type segments.

In another example of the present disclosure the composite spring-type segment is in the form of a fully elastic spring without heat generation when cyclically deformed under the effect of a compressive load applied perpendicularly on an outer surface.

In another example of the present disclosure the composite spring-type segment spans radially around the wheel in 120 degree segments and four semi-elliptical-shaped springs are fixed to the bottom surface of the composite spring-type segment and the semi-elliptical-shaped springs are arranged adjacently offset such that at least one of the four semi-elliptical-shaped springs is at least partially outside radially of the 120 degree segment.

In another example of the present disclosure the composite spring is constructed from continuous reinforcing filaments impregnated with thermosetting resin which allows varying mechanical strength as well as rigidity for a fixed geometry and sizing.

In another example of the present disclosure, a run flat device intended to be fitted to a tubeless mounted assembly for a motor vehicle, which comprises a wheel rim and a tire cover comprising beads mounted against edges of the rim, the run flat device comprising an annular supporting structure which is configured to be mounted around the rim so as to support the cover following a drop in inflating pressure inside the mounted assembly, comprising: at least one composite spring-type segment assembled circumferentially around the rim having at least one extended end; at least one semi-elliptical-shaped spring shaped from the incorporation of at least one elliptical multi-spring installed under the composite spring-type segment, such that the at least one composite spring-type segment is assembled circumferentially around the rim by fixing the extended end of the at least one composite spring-type segment to the at least one semi-elliptical-shaped spring; and an arrangement for locking the beads against the edges which are configured to connect the annular supporting structure to these beads; wherein the at least one semi-elliptical-shaped spring is formed in tension and is compressed following a drop in inflating pressure inside the mounted assembly.

In another example of the present disclosure the plurality of semi-elliptical-shaped springs are formed in tension and contact one another when a drop in inflating pressure inside the mounted assembly occurs.

In another example of the present disclosure the annular supporting structure further comprises an end-to-end assembly of the composite spring-type segments allowing a uniform stress distribution in tension over the entire width of the run flat.

In another example of the present disclosure the extended end of the composite spring-type segment is configured to attach to one of the plurality of semi-elliptical-shaped springs while a second extended end of a second composite spring-type segment is configured to attach to the semi-elliptical-shaped springs.

In another example of the present disclosure the composite spring-type segment is in the form of a fully elastic spring without heat generation when cyclically deformed under the effect of a compressive load applied perpendicularly on an outer surface.

In another example of the present disclosure the composite spring-type segment spans radially around the wheel in 120 degree segments and four semi-elliptical-shaped springs are fixed to the bottom surface of the composite spring-type segment and the semi-elliptical-shaped springs are arranged adjacently offset such that at least one of the four semi-elliptical-shaped springs is at least partially outside radially of the 120 degree segment.

In another example of the present disclosure the composite spring is constructed from continuous reinforcing filaments impregnated with thermosetting resin which allows varying mechanical strength as well as rigidity for a fixed geometry and sizing.

In another example of the present disclosure, a run flat device intended to be fitted around a wheel rim and within a tire cover, the run flat device comprising an annular supporting structure which is configured to be mounted around the wheel rim so as to support the tire cover following a drop in inflating pressure inside the mounted assembly, comprising: at least one composite spring-type segment assembled circumferentially around the rim having at least one extended end; at least one semi-elliptical-shaped spring configured for the incorporation of at least one elliptical multi-spring, such that the at least one composite spring-type segment is assembled circumferentially around the at least one semi-elliptical-shaped spring by fixing the at least one elliptical multi-spring to a bottom surface of the composite spring-type segment; and wherein the at least one semi-elliptical-shaped spring is formed in tension and is compressed following a drop in inflating pressure inside the mounted assembly.

In another example of the present disclosure the width of the at least one composite spring-type segment is double the width of the at least one semi-elliptical-shaped spring.

In another example of the present disclosure the composite spring-type segment spans radially around the wheel rim in 120 degree segments and four semi-elliptical-shaped springs are fixed to the bottom surface of the composite spring-type segment and the semi-elliptical-shaped springs are arranged adjacently offset such that at least one of the four semi-elliptical-shaped springs is at least partially outside radially of the 120 degree segment.

In another example of the present disclosure the extended end of the composite spring-type segment is configured to attach to one of the plurality of semi-elliptical-shaped springs while a second extended end of a second composite spring-type segment is configured to attach to the semi-elliptical-shaped springs.

In another example of the present disclosure the extended end of the composite spring-type segment is configured to attach to one of the plurality of semi-elliptical-shaped springs while a second extended end of a second composite spring-type segment is configured to attach to the semi-elliptical-shaped springs.

Advantageously, the run flat device having the annular supporting structure described herein is substantially light weight, includes a reduced surface area, and minimizes heat production.

The present disclosure includes a spring which has the particularity of restoring its deformation energy up to 100% under the effect of rapid deformation without generating heat. In the case of rubber or similar materials, due to the hysteresis properties, heat is generated under the effect of rapid deformation. A composite or similar material spring is characterized by the ability to generate an unlimited variety of spring constant and mechanical resistance, specifically but not limited to load and strain. The composite spring may offer a multitude of possibilities of loading while maintaining an elastic behavior under load tension, compression, or shear forces while a rubber based material is limited to maintaining an elastic behavior under compression. Such composite material properties allow for the generation of elastic hollow bodies such as the presently disclosed run flat concept. An advantage of the elastic hollow body is the exposed transverse surface of the run flat is minimized, thereby reducing its exposure to ballistic shots or projectiles.

Another advantage is that the composite laminate has an increased resistance to ballistic penetrations due to its localized energy absorption capacity.

BRIEF DESCRIPTION OF THE DRAWINGS

Other features, advantages and details of the present invention will emerge on reading the following description of several embodiments of the invention given by way of illustration and not being limiting, said description being made with reference to the appended drawings.

DESCRIPTION OF THE INVENTION

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

In the present description, the expressions "axially internal" and "axially external" refer respectively to the sides of the wheel rim which are intended to face toward the inside and toward the outside of the motor vehicle when a mounted assembly comprising this rim has been mounted on a vehicle.

The present disclosure is directed to, in general, a run flat system and, in particular, to a run flat system having a spring suspension. Certain preferred and non-limiting aspects of the components of the run flat are illustrated in FIGS. 1-10.

Figure 2:
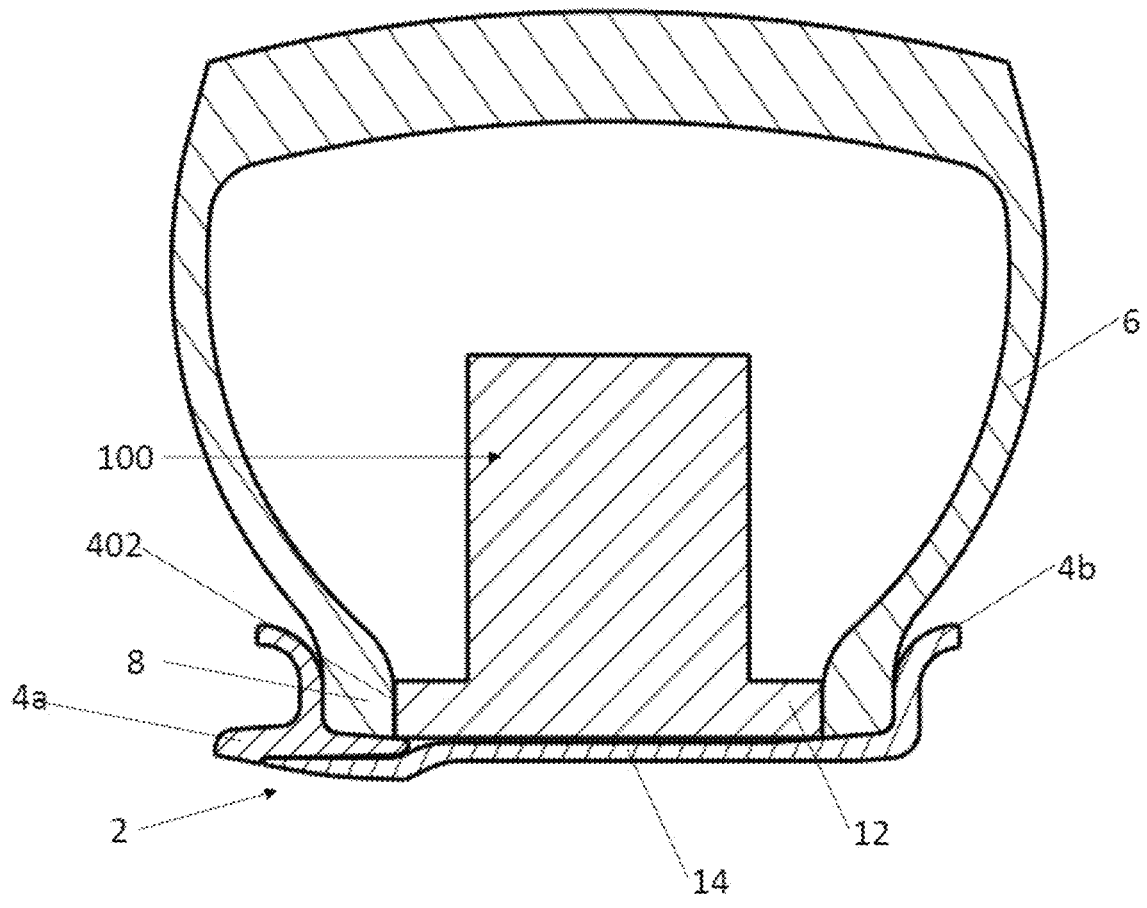
FIG. 2 is a view in axial half-section of a mounted assembly incorporating a flat-running device according to an embodiment of the invention incorporating rigid means of connection between sectors.
Figure 3:
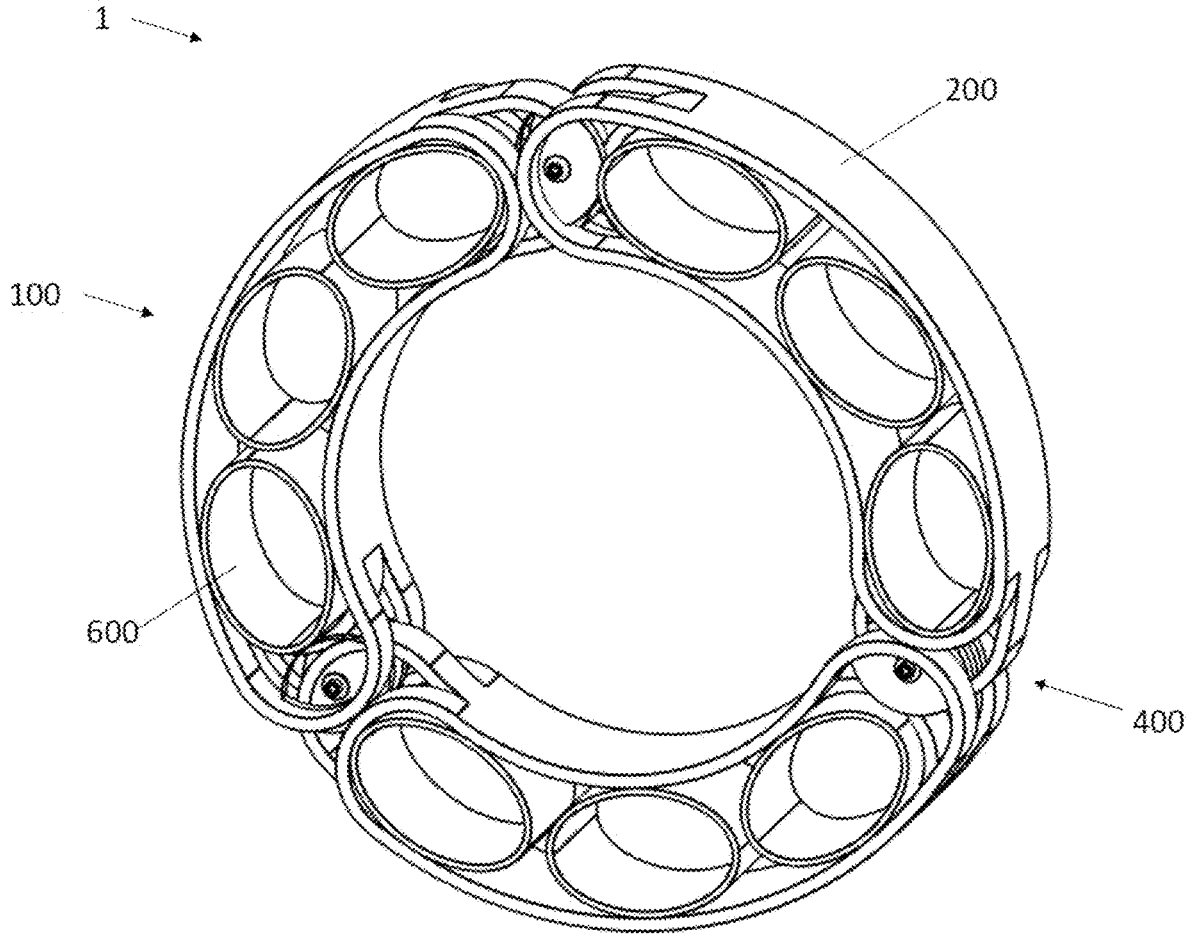
FIG. 3 is a view in perspective of an embodiment of the annular support structure assembled.
Figure 4:
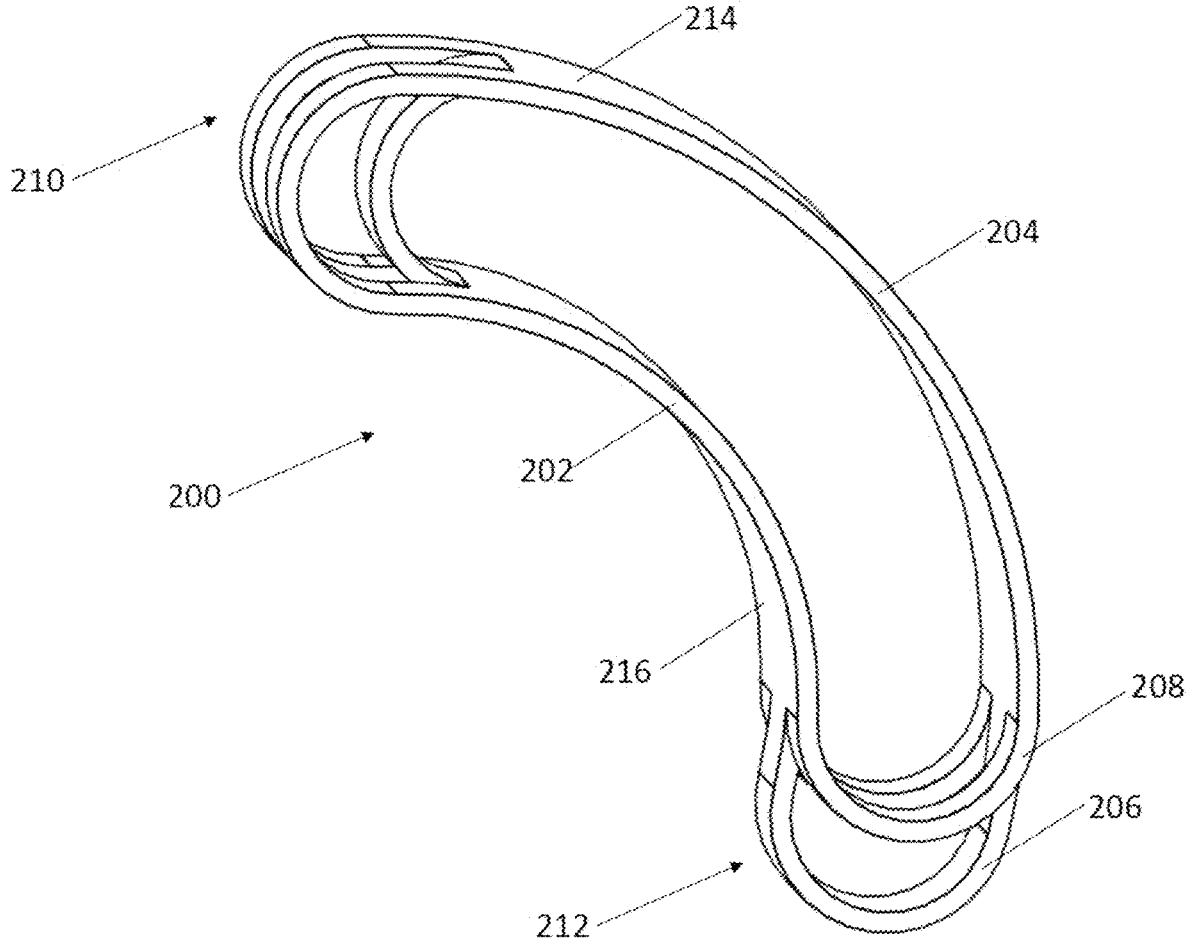
FIG. 4 is a view in perspective of an embodiment of a composite spring-type segment.

The flat running device 1 according to an embodiment of the invention, which is illustrated in FIGS. 2-4, comprises a wheel rim 2 having a first rim seat 4a and second rim seat 4b, an annular supporting structure 100 with at least one composite spring type segment 200 or spring segment 200 secured to itself by attachment means (not illustrated) of the bolt type. In one embodiment there are three composite spring type segments 200 secured to each other by a connection member 400 of the bolt type. The connection member 400 may include a bolt sleeve 800 as shown in FIG.

Figure 8:
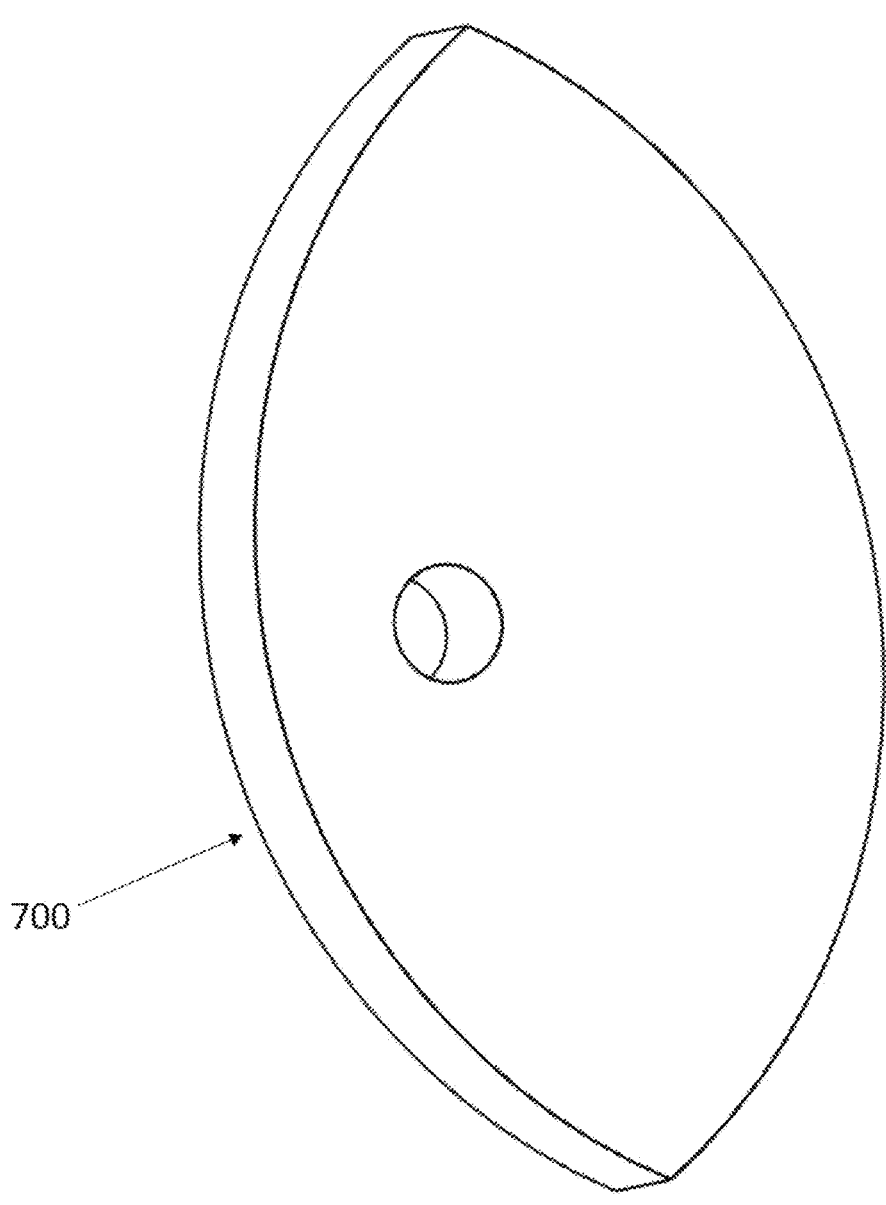
FIG. 8 is a view in perspective of an example of a connection member for connecting the composite spring-type segments.
Figure 9:
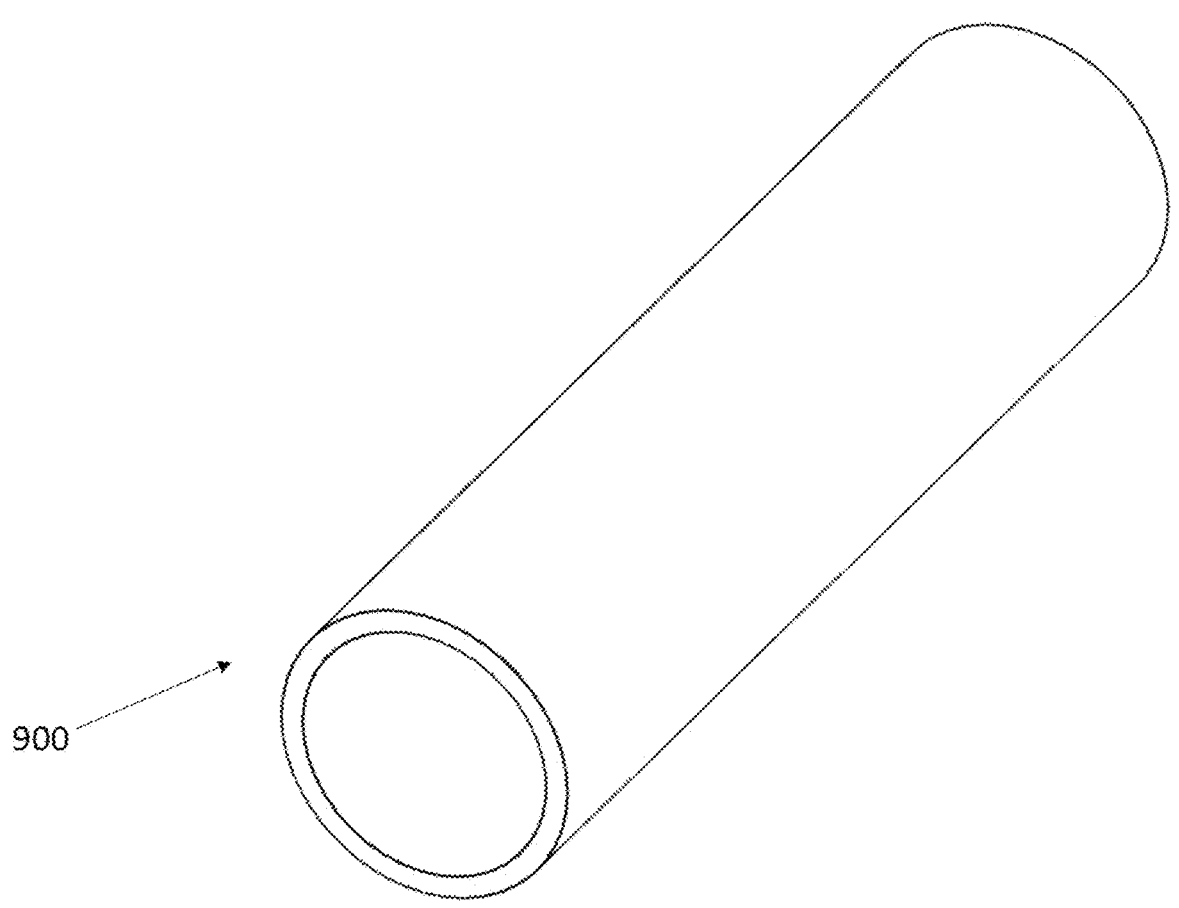
FIG. 9 is a view in perspective of an example of a spacer.
Figure 10:
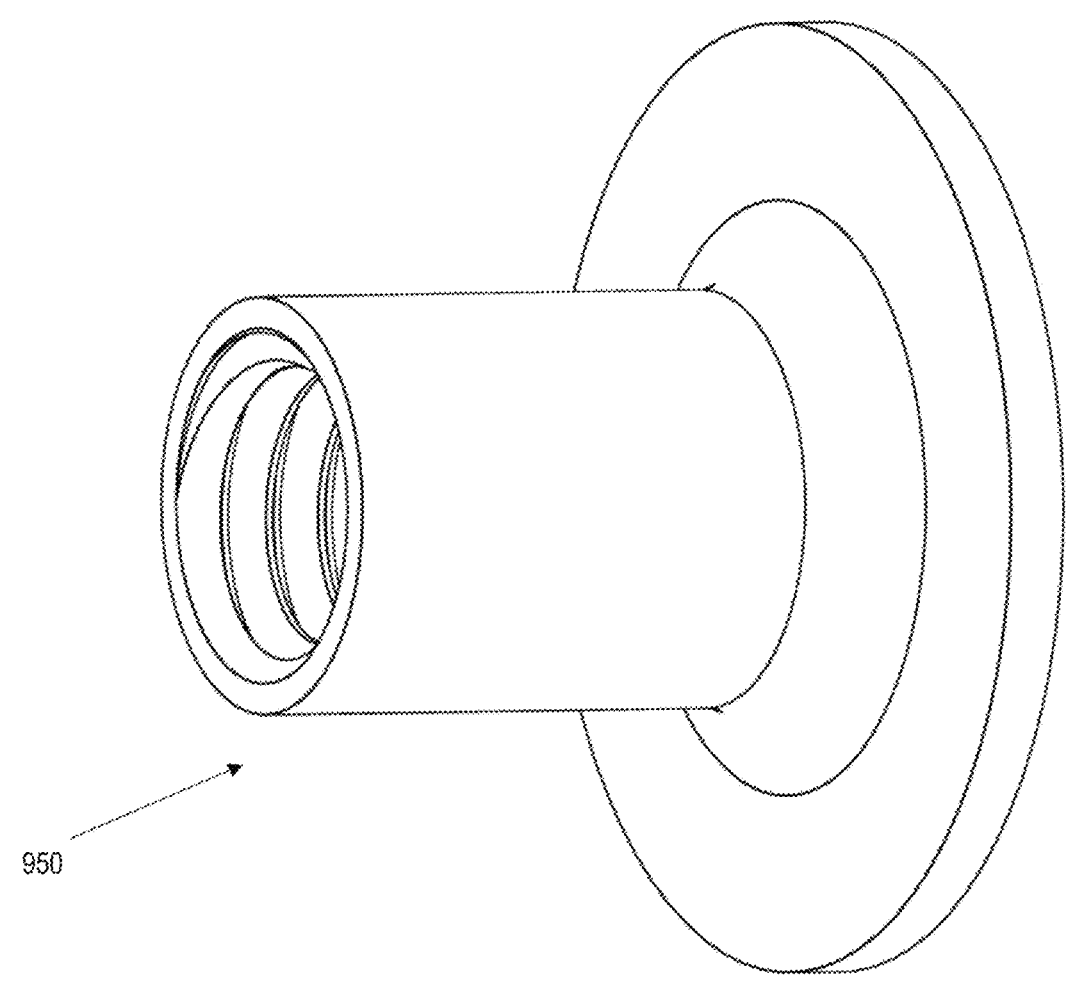
FIG. 10 is a view in perspective of an example of a tee nut.

7; a connector 700 as shown in FIG. 8; a spacer 900 as shown in FIG. 9; and a tee nut 950 as shown in FIG. 10. In another embodiment as illustrated in FIGS. 11-14, three spring type segments 2000 are secured to semi-elliptical-shaped springs 6000 or ellipse springs 6000 by a connection member 4000 of the bolt type. The connection member 4000 may include an extended end 2100 of the spring type segment 2000 which aligns with another extended end 2100 of another spring type segment 2000 as shown in FIGS. 11-14.

The composite spring type segments 200 comprise respectively axially inner edge 202 and outer edge 204 delimiting respectively on the rim seats 4a, 4b extending axially from the edges 202, a tire casing 6 of which the beads 8 are mounted resting on the seats or edges 12 against the edges 202, and a flat running device 1 mounted around the rim 2 and 4 inside the casing 6 and designed to support the latter following a drop in inflation pressure inside the mounted assembly device 1.

In the example of FIG. 2, the device 1 is mounted on a rim bottom 14 that is of the substantially flat type. This device 1 comprises an annular supporting structure 100 which is designed to be mounted on the rim 2 for the purpose of supporting the casing 6, following a drop in inflation pressure inside the mounted assembly 1, and which is divided into preferably, but not limited to, three composite spring type segments 200 each in an arc of a circle and of a hollowly formed structure which are articulated together via connection member 400 and which are suitable for forming the annular supporting structure 100 by juxtaposition in the circumferential direction of the latter, and connectors 700 for locking the beads 8 against the edges 12 which are designed to connect the annular support structure 100 to the beads 8 and which are each in a single piece, being based on rubber that is reinforced by a circumferential reinforcement element (not illustrated), these connectors 700 may be wedges being pressed laterally on a radially inner zone of the composite spring type segments 200 situated facing the connection member 400 so as to hold them in position when running. Preferably, in this embodiment, the three composite spring type segments 200 are divided to cover the rim 2 in 120 degree segment. Each composite spring type segment 200 are approximate in length to span and cover the distance of the rim that would be 120 degrees measured radially from the center of the rim 2.

Each of the composite spring type segments 200 is may be preferably made of composite materials, i.e. resulting from the combination of unidirectional fibers impregnated with a resinous matrix of thermosetting type (Epoxy, Urethane), but not limited to such, as thermoplastic resin may be used. The continuous reinforcement type fibers are made of glass, or carbon or basalt or aramid or thermoplastic such as but not limited to Dyneema and Spectra. Metal filaments may be used to provide localized reinforcement at the joints of inter-segment fittings. The manufacture of the composite spring type segments 200 may be carried out using, but not limited to, a filament winding process or a multiple reinforcement winding process, but may be a weaving or braiding of non-crimp fabric or short fiber in addition to unidirectional fiber. The winding of the continuous reinforcing filaments is of the circumferential type for at least one of the two types of springs used. The spring rate or other properties of the composite spring type segments 200 may be altered by winding the fibers to a specified thickness. The composite spring type segments 200 may be surmounted radially by a protective coating with a preferably rigid rubber or elastomeric base. It will be noted however that this coating could, as a variant, consist of a flexible rubber/reinforcing elements composite.

As for the geometry of each composite spring type segment 200, it has, in the example of FIGS. 3 and 4, in the radially inner zone on which the locking wedges rest, a substantially trapezoidal axial section which widens axially on the radially inner face of the composite spring type segments 200 in order to form a base 214/216 of the latter and, in a radially outer zone surmounting the foregoing, an axial section substantially in the shape of an isosceles trapezium the large base of which coincides with the protective coating.

As for the geometry of each end for the attachment member 400 of the composite spring type segment 200, it has, in the example of FIGS. 3 and 4, a first loop end 206 and two second loop ends 208 opposite the first end 210 separated by and connected between the top surface 214 and bottom surface 216. The overall geometry of the composite spring type segment 200 may be similar to a warped ellipse or banana-shaped, the top surface 214 being longer than the bottom surface 216 in length due to the curvature of the composite spring type segments 200. The edge 202 of the bottom surface 216 contacts the wheel rim 14 while the edge 204 of the top surface 214 contacts the casing 6 when the compression forces are applied to the casing 6 and the tire is in a flat state or a drop in inflating pressure inside the flat running device 1. The top surface 214 may act like a bearing surface against the cover 6. The second end 212 may include two first loop ends 206 and second loop end 208 which may be configured to attach to another the first end 210 of another composite spring type segment 200 via an attachment member 400.

As illustrated in the examples of FIGS. 3, 4 and 6-9 the connection member 400 for articulating the composite spring type segments 200 together are located between the first loop end 206 of a first and second composite spring type segment 200. The first end 210 and second end 212 may comprise two sections of concentric loops separated by another loop further in length from the outer and inner portions. This could be considered the male connection piece. This would attach to a second end 212 of another composite spring type segment 200 via the other composite spring type segments 200 second loop end 210 having two concentric loops separated by another loop which is closer in length to the outer and inner portions. This could be considered the female connection piece. The attachment member 400 may connect each end as an articulated lug or pin 500 having geometry to fit the inner area of each loop end.

Figure 5:
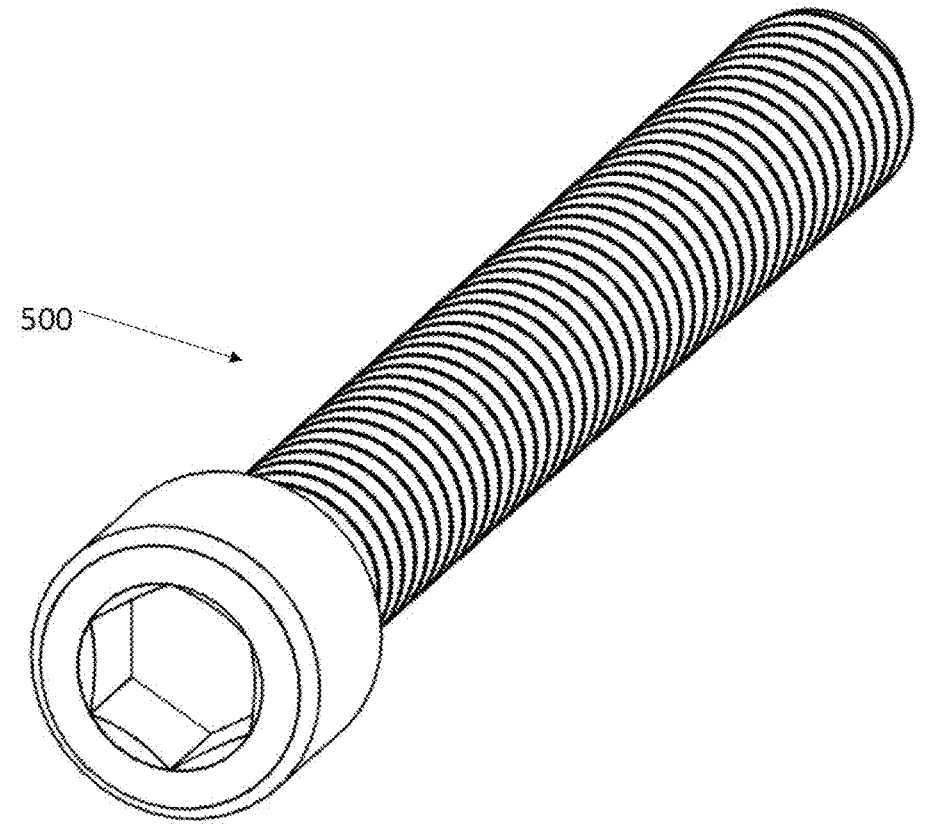
FIG. 5 is a view in perspective of an example of a connection member bolt or pin.
Figure 6:
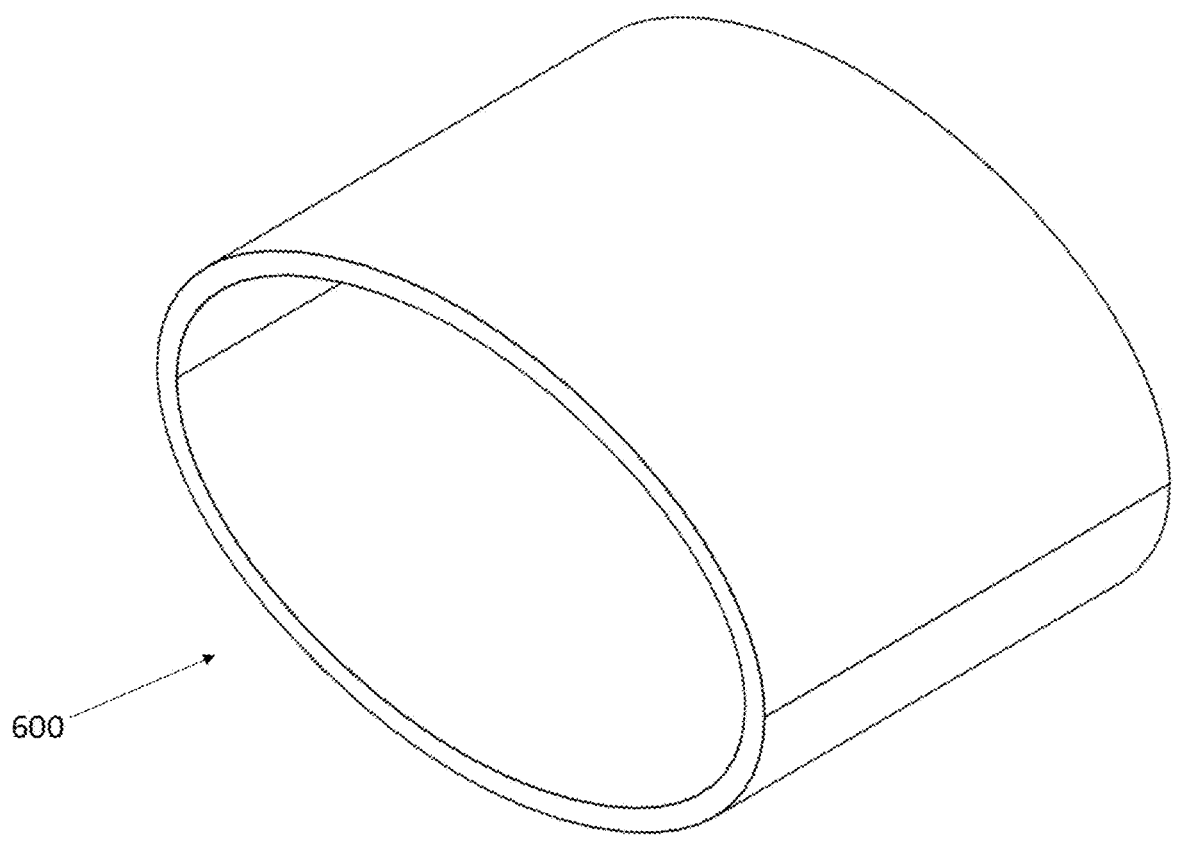
FIG. 6 is a view in perspective of an embodiment of a semi-elliptical-shaped spring.
Figure 7:
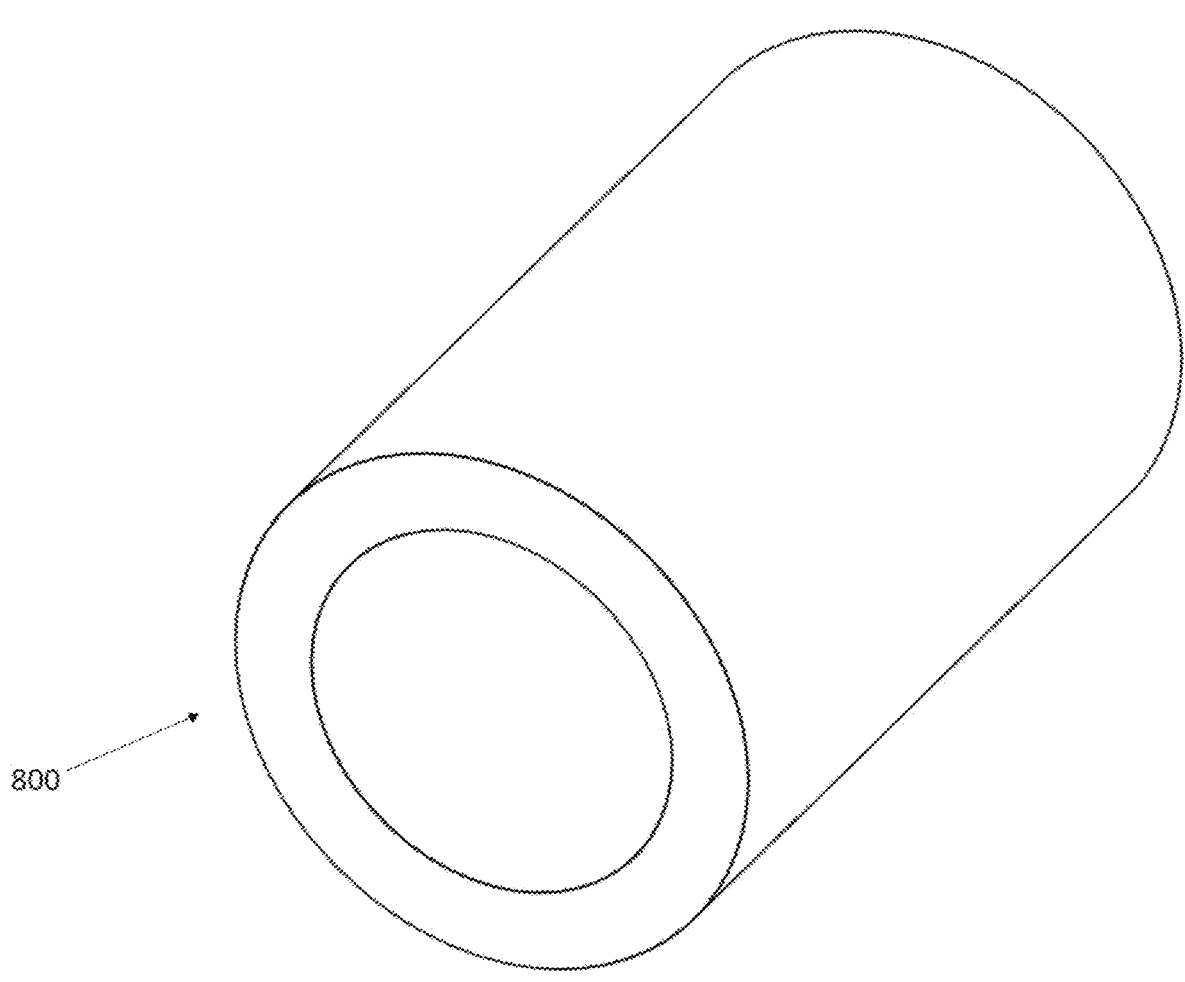
FIG. 7 is a view in perspective of a bolt sleeve.

In an exemplary embodiment, the connection member 400 attach and hold the connection pin 500, the connection pin 500 as illustrated in FIG. 5, which facilitates connection between the three composite spring type segments 200. When the composite spring type segments 200 are releasably fixed or joined by means of the pins 500, the annular supporting structure 100 evenly contacts and conforms to the outer surface flat base diameter of the wheel rim 2 or rim bottom 14.

In an exemplary embodiment, three semi-elliptical-shaped springs 600 or ellipse springs are located in between the top surface 214 and bottom surface 216 of the structure of the composite spring type segment 200. In an exemplary embodiment, the semi-elliptical-shaped springs 600 are preferably essentially elliptical in shape, but may be any geometric shape allowing a spring action, but specifically trapezoidal, kidney, or kidney-bean shaped. Specifically, kidney shaped may include a concave side portion. Semi-elliptical-shaped may be any shape having one radius greater in length than another radius. The semi-elliptical-shaped springs 600 are preferably made of the same or a similar material of the composite spring type segment 200. The semi-elliptical-shaped springs 600 act as a spring in tension or compression to maintain the structural support of the composite spring type segment 200 and turn the annular supporting structure 100. While the embodiment includes three semi-elliptical-shaped springs 600, the number of semi-elliptical-shaped springs 600 is variable depending on the resistance under load requirements and the desired uniformity of circumferential deformation of the annular supporting structure 100.

Further, the individual thickness of the semi-elliptical-shaped springs 600 is variable depending on the structural requirements and composition of the laminate applied by filaments winding. Each of the semi-elliptical-shaped springs 600 is preferably made of a composite material, i.e. resulting from the combination of unidirectional fibers impregnated with a resinous matrix of thermosetting type (Epoxy, Urethane), but not limited to such, as thermoplastic resin may be used. The continuous reinforcement type fibers are made of glass, or carbon or basalt or aramid or thermoplastic such as but not limited to Dyneema and Spectra. Metal filaments may be used to provide localized reinforcement at the joints of inter-segment fittings. The manufacture of the semi-elliptical-shaped springs 600 may be carried out using, but not limited to, the filament winding process or a multiple reinforcement winding process, but may be a weaving or braiding of non-crimp fabric or short fiber in addition to unidirectional fiber. The winding of the continuous reinforcing filaments is of the circumferential type for at least one of the two types of springs used. The spring rate or other properties of the semi-elliptical-shaped springs 600 may be altered by winding the fibers to a specified thickness. The semi-elliptical-shaped springs 600 may be surmounted radially by a protective coating with a preferably rigid rubber or elastomeric base. It will be noted however that this coating could, as a variant, consist of a flexible rubber/reinforcing elements composite.

The semi-elliptical-shaped springs 600 may be wound in tension. When compressed, the semi-elliptically-shaped springs 600 remain in tension allowing an increase in load strength resistance. The semi-elliptically-shaped springs 600, when used in multiples, press or form against one another when under force to distribute load between such. High stress areas on the semi-elliptically-shaped springs 600, causes the ellipse shape which contacts the adjacent the semi-elliptically-shaped springs 600 and compresses all the semi-elliptically-shaped springs 600. The controlled stiffness properties of the semi-elliptically-shaped springs 600 allow for a controlled distribution of the load force. When the tire is in a flat state or a drop in inflating pressure inside the mounted assembly occurs, distribution of the increased load force is needed to maintain the integrity of the tire. This disclosure of the flat running device 1 using elliptically-shaped springs 600 remaining in tension is contrary to the known method of using elastomeric properties.

In an exemplary embodiment, three semi-elliptically-shaped springs 600 are fixed within the composite spring type segment 200. The semi-elliptically-shaped springs 600 may be fixed to the composite spring type segment 200 by bolting, riveting, gluing, mechanical inter-spring interlocking, or any other relative fixing means. The fixing means is determined based on multidirectional mechanical stresses, thermal expansion, performance requirements, or any other relative factors.

To mount the flat-running device 1, according to one example of the embodiment, the user advantageously proceeds in the following manner: the composite spring type segments 200 are first inserted end-to-end and not connected together inside the tire casing 6; these composite spring type segments 200 are placed facing one another inside the casing 6, both axially and radially as well as circumferentially; the composite spring type segments 200 are connected together inside the casing 6 by assembling the connection member 400 (insertion of each lug or bolt 500 into the corresponding loop ends 206/208 and connectors 700 axially on either side of the loop ends 206/208); the two locking wedges are positioned axially against these composite spring type segments 200 thus connected and radially facing the connector 700 in order to hold them in position when running; the flat-run device 1 thus assembled is made to slide over the axially inner surface of the rim bottom 14 of the rim 18.

In another embodiment, circumferential clamping of the composite spring type segments 200 on the wheel may include at least one of the pins 500 used is of oval geometry. At least one of the connectors 700 may provide a tensioning movement within the double shear overlap of connection member 400. Under the effect of rotation of the pins 500 dedicated to this function when installing the annular supporting structure 100 on the rim 2, a circumferential clamping of the annular supporting structure 100 on the rim 2 is induced and prevents relative movement between the rim 2 and the annular supporting structure 100. To maintain a constant long term circumferential grip of the annular supporting structure 100 with the rim 2, a plurality of elastomeric components within the connection member 400 inside which the pins 500 are installed may be used.

Additionally, a lubricant may be applied to the rim 2 to lower the amount of potential friction between the annular supporting structure 100 and the rim 2 to reduce the amount of heat produced.

As indicated above, it will be noted that the composite spring type segments 200, and in total the annular supporting structure 100, can move reversibly relative to one another both axially and in mutual torsion, via the combined axial sliding and pivoting of the lugs or pins 500 on the connector 700 and via the flexibility of the locking wedges under the effect of lateral shearing or compression forces applied to the casing 6 when the tire is in a flat state or a drop in inflating pressure inside the flat running device.

When the tire is in a flat state or a drop in inflating pressure inside the flat running device 1, the lack of air pressure causes the casing 6 to sag at the point of contact with the road and the inner surface of the casing 6 and outer surface 214 of the composite spring type segment 200 or annular supporting structure 100 to contact. Depending on the size of the tire, the surface area of contact between the inner surface of the casing 6 and outer surface 214 of the composite spring type segment 200 or annular supporting structure 100 may vary. Preferably the area of contact is between 5"and 7" long by 5" wide. When the tire is in a flat state or a drop in inflating pressure inside the flat running device 1 and rotation is occurring, the surface area may be approximately the length of the semi-elliptically-shaped spring 600. Preferably to evenly distribute the pressure distribution on the outer surface 214 of the composite spring type segment 200 or annular supporting structure 100, the use of two 2.5 inch wide semi-elliptically-shaped springs 600 offset by 2.5 inches may be required. Therefore, a wavy linear deformation of the composite spring type segment 200 occurs when placed under circumferential load due to the rotation of the tire. Therefore, there are discontinuities along the circumferential surface at the connection member 400, when referring to load force. The surface discontinuities may be located at 120 degrees of circumference and are of an approximate length similar to the semi-elliptically-shaped springs 600 (approximately 4-5 in) and a decrease in contacting area that is common with other known run flat designs.

Figure 1:
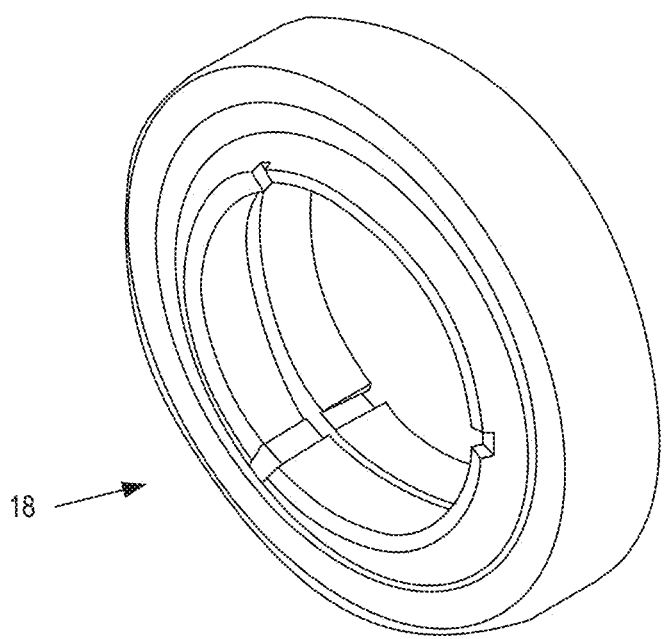
FIG. 1 is a view in perspective of an embodiment of the run flat device.
Figure 11:
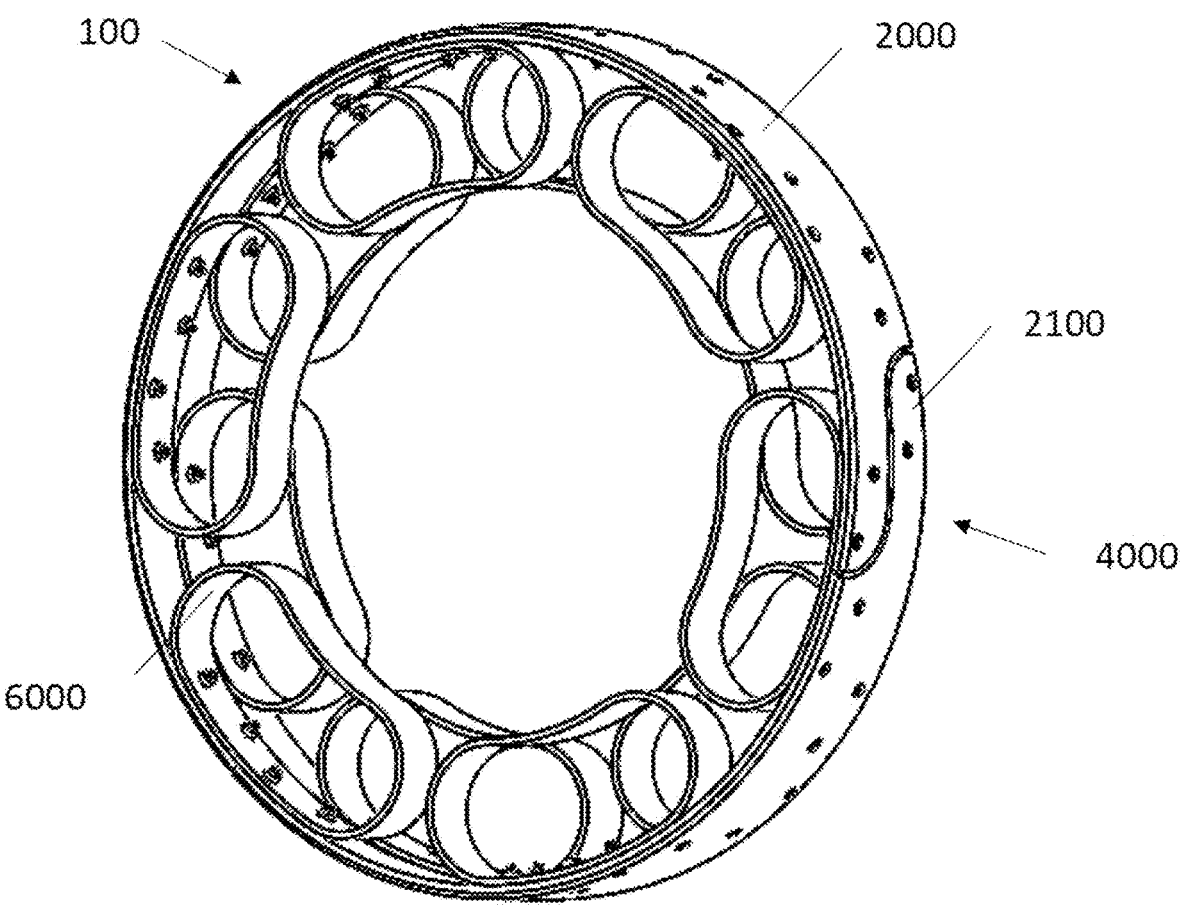
FIG. 11 is a view in perspective of another embodiment of the annular support structure assembled.

In the example of FIG. 11, like the examples of FIGS. 1 and 2, the device 1 is mounted on a rim bottom 14 that is of the substantially flat type. This device 1 comprises an annular supporting structure 100 which is designed to be mounted on the rim 2 for the purpose of supporting the casing 6, following a drop in inflation pressure inside the mounted assembly 1, and which is divided into preferably, but not limited to, three composite spring type segments 2000 or spring segments 2000 each in an arc of a circle and which are articulated together at extended ends 2100 and which are suitable for forming the annular supporting structure 100 by juxtaposition in the circumferential direction of the latter, and a connection member 4000 which are designed to connect semi-elliptical-shaped springs 6000 or elliptical springs 6000 to the beads 8 and which are each in a single piece, being based on rubber that is reinforced by a circumferential reinforcement element (not illustrated), these semi-elliptical-shaped springs 6000 may be pressed laterally on a radially inner zone of the composite spring type segments 2000 situated to hold the annular supporting structure 100 in position when running. Preferably, the three composite spring type segments 2000 are divided to radially cover the rim 2 in about 120 degree segments. Each composite spring type segment 2000 are approximate in length to span and cover the distance of the rim that would be 120 degrees measured radially from the center of the rim 2.

Each of the composite spring type segments 2000 are preferably made of a composite of composite materials, i.e. resulting from the combination of unidirectional fibers impregnated with a resinous matrix of thermosetting type (Epoxy, Urethane), but not limited to such, as thermoplastic resin may be used. The continuous type fibers are made of glass, or carbon or basalt or aramid or thermoplastic such as but not limited to Dyneema and Spectra. Metal reinforcement filaments may be used to provide localized reinforcement at the joints of inter-segment fittings. The manufacture of the composite spring type segments 2000 may be carried out using the filament winding process or a multiple reinforcement winding process, but may be a weaving or braiding of non-crimp fabric or short fiber in addition to unidirectional fiber. The winding of the continuous reinforcing filaments is of the circumferential type for at least one of the two types of springs used. The spring rate or other properties of the composite spring type segments 2000 may be altered by winding the fibers to a specified thickness. The composite spring type segments 2000 may be surmounted radially by a protective coating with a preferably rigid rubber or elastomeric base. It will be noted however that this coating could, as a variant, consist of a flexible rubber/reinforcing elements composite.

Figure 12:
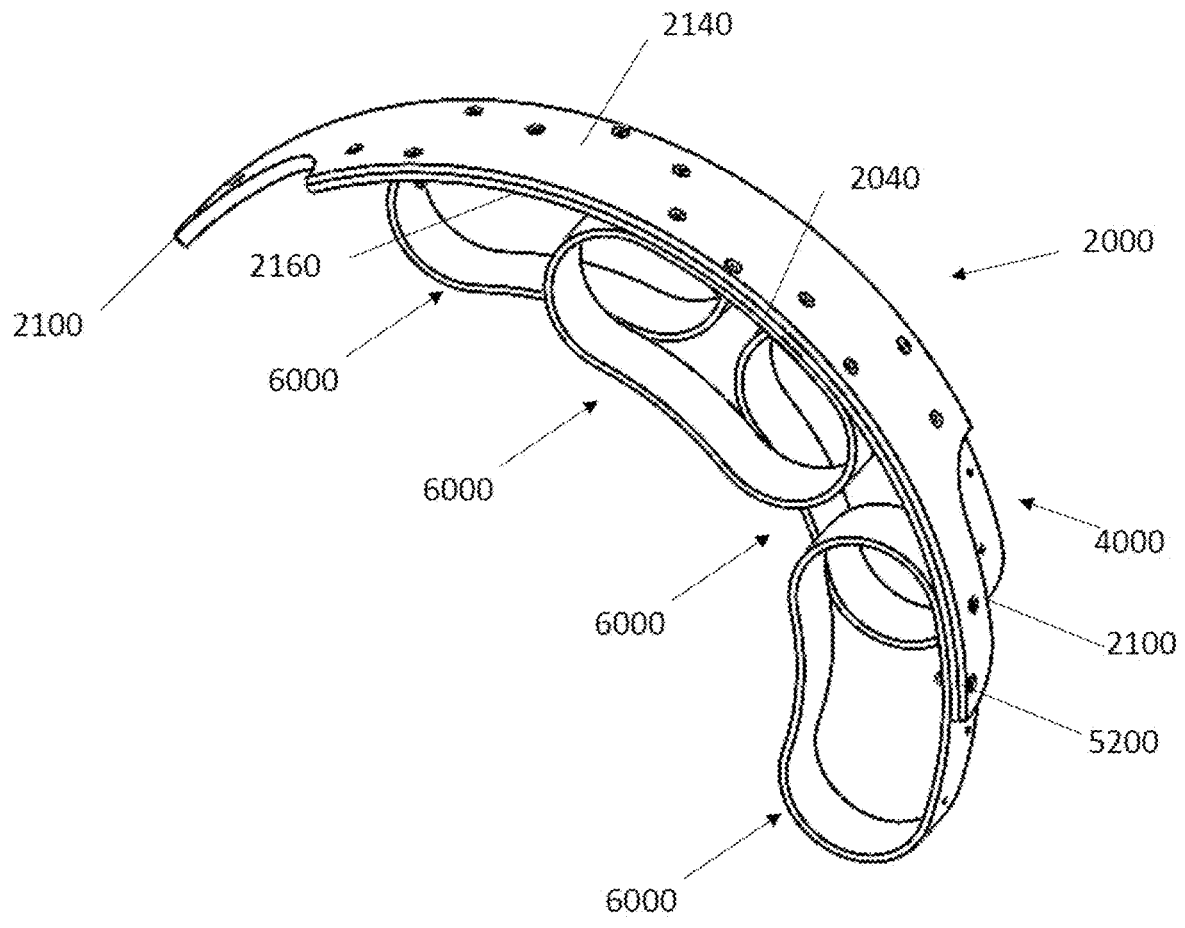
FIG. 12 is a view in perspective of another embodiment of a composite spring-type segment fixed to another embodiment of a semi-elliptical-shaped spring.

As for the geometry of each composite spring type segment 2000, it has, in the example of FIG. 12, a radially inner surface 2160 which the semi-elliptical-shaped springs 6000 are fixed to and a radially outer surface 2140 surmounting the foregoing, an axial section of which coincides with the protective coating.

Figure 15:
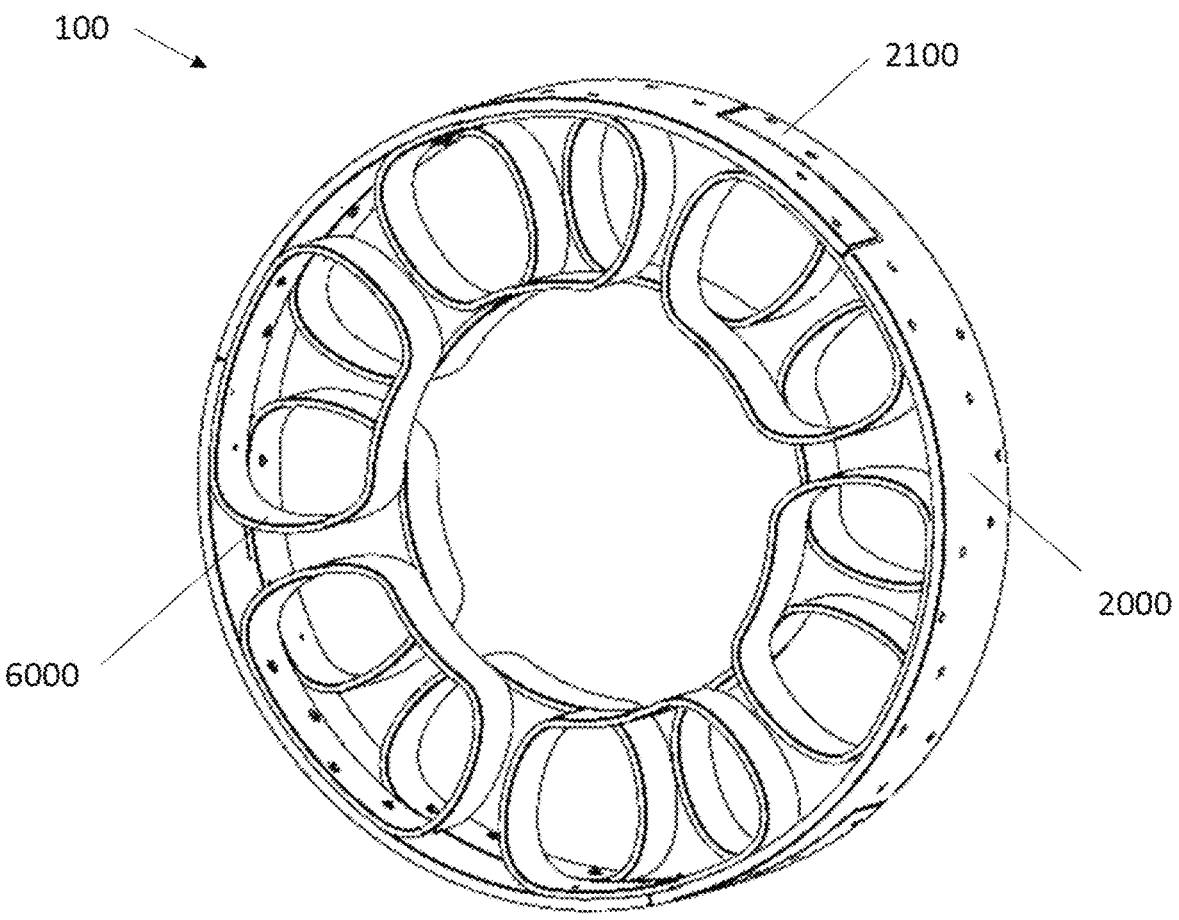
FIG. 15 is a view in perspective of another embodiment of the annular support structure assembled.

As for the geometry of each connection member 4000, the composite spring type segments 2000 have at least one extended end 2100, as shown in the example of FIGS. 11, 12, and 15. The extended end 2100 may align with an extended end 2100 of another composite spring type segment 2000. The geometry of the extended end 2100 may be any symmetrical shape to mirror or align with the geometry of the extended end 2100 of another composite spring type segment 2000. The geometry or shape of the extended end 2100 may be curved such that the peak of one extended end 2100 aligns with the valley of another extended end 2100. As shown in the example of FIG. 15, the extended ends 2100 may be rectangular. The overall geometry of the composite spring type segment 2000 is similar to a third of a circumference of a circle, the top surface 2140 being longer than the bottom surface 2160 in length due to the curvature or arc of the composite spring type segments 2000. The bottom surface 2160 contacts or is fixed to the semi-elliptical-shaped springs 6000, while the edge 2040 of the top surface 2140 contacts the casing 6 when the compression forces are applied to the casing 6 and the tire is in a flat state or a drop in inflating pressure inside the flat running device 1. The top surface 2140 may act like a bearing surface against the cover 6.

Figure 14:
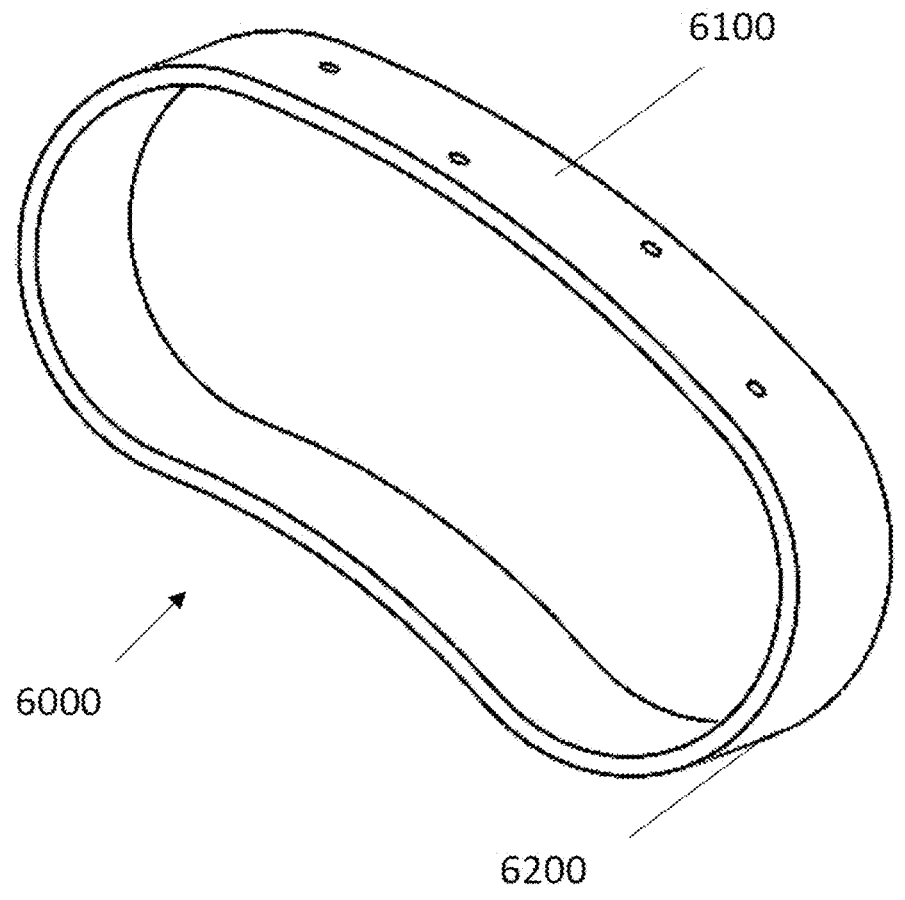
FIG. 14 is a view in perspective of another embodiment of a semi-elliptical-shaped spring.

In a preferred embodiment, twelve semi-elliptical-shaped springs 6000 are located in between the bottom surface 2160 of the composite spring type segment 2000 and the rim bottom 14. As illustrated in the embodiment of FIG. 14, the semi-elliptical-shaped springs 6000 are preferably essentially kidney-shaped in shape, but may be any geometric shape allowing a spring action specifically trapezoidal, kidney, or kidney-bean shaped. Specifically, kidney shaped may include a concave side portion. Semi-elliptical-shaped may be any shape having one radius greater in length than another radius. In the embodiment of FIG. 15, the semi-elliptical-shaped springs 6000 are trapezoidal in shape. The shape of the semi-elliptical-shaped springs 6000 may be dependent upon the load capacity requirements, for example, in the embodiment of FIG. 15 the load capacity may be twelve thousand pounds and the shape of the semi-elliptical-shaped springs 6000 have an increased height or are more trapezoidal in view of the embodiment of the semi-elliptical-shaped springs 6000 of FIG. 14. The semi-elliptical-shaped springs 6000 are preferably made of the same or a similar material of the composite spring type segment 2000. The semi-elliptical-shaped springs 6000 act as a spring in tension to maintain the structural support of the composite spring type segment 2000 and turn the annular supporting structure 100. While a preferred embodiment includes twelve semi-elliptical-shaped springs 6000, the number of semi-elliptical-shaped springs 6000 is variable depending on the resistance under load requirements and the desired uniformity of circumferential deformation of the annular supporting structure 100. The semi-elliptical-shaped springs 6000 may be any width, but are preferably half the width of the composite spring type segments 2000, such that the semi-elliptical-shaped springs 6000 may be arranged adjacent while fixed to the composite spring type segments 2000.

Further, the individual shape and thickness of the semi-elliptical-shaped springs 6000 are variable depending on the structural requirements and composition of the laminate applied by filaments winding. Each of the semi-elliptical-shaped springs 6000 are preferably made of composite materials, i.e. resulting from the combination of unidirectional fibers impregnated with a resinous matrix of thermosetting type (Epoxy, Urethane), but not limited to such. The continuous type fibers are made of glass, or carbon or basalt or aramid or thermoplastic such as but not limited to Dyneema and Spectra. Metal filaments may be used to provide localized reinforcement at the joints of inter-segment fittings. The manufacture of the semi-elliptical-shaped springs 6000 may be carried out using the filament winding process. The winding of the continuous reinforcing filaments is of the circumferential type for at least one of the two types of springs used. The spring rate or other properties of the semi-elliptical-shaped springs 6000 may be altered by winding the fibers to a specified thickness. The semi-elliptical-shaped springs 6000 may be surmounted radially by a protective coating with a preferably rigid rubber or elastomeric base. It will be noted however that this coating could, as a variant, consist of a flexible rubber/reinforcing elements composite.

The semi-elliptical-shaped springs 6000 may be wound in tension. When compressed, the semi-elliptically-shaped springs 6000 remain in tension allowing an increase in load strength resistance. The semi-elliptically-shaped springs 6000, when used in multiples, may press or form against one another when under force to distribute load between such. High stress areas on the semi-elliptically-shaped springs 6000, causes the kidney-shape shape which contacts the adjacent the semi-elliptically-shaped springs 6000 and compresses all the semi-elliptically-shaped springs 6000. The controlled stiffness properties of the semi-elliptically-shaped springs 6000 allow for a controlled distribution of the load force. When the tire is in a flat state or a drop in inflating pressure inside the mounted assembly occurs, distribution of the increased load force is needed to maintain the integrity of the tire. This disclosure of the flat running device 1 using elliptically-shaped springs 6000 remaining in tension is contrary to the known method of using elastomeric properties.

Figure 13:
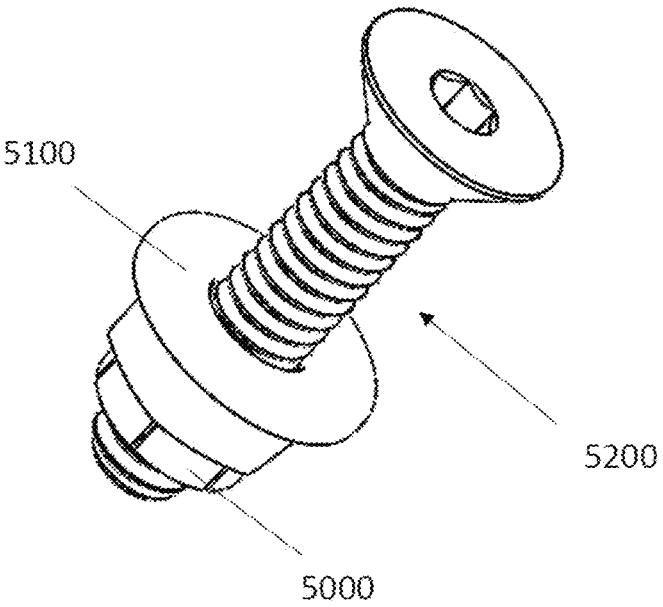
FIG. 13 is a view in perspective of another example of a connection member bolt or pin.

In a preferred embodiment, twelve semi-elliptically-shaped springs 6000 are fixed within the three connected composite spring type segments 2000. The semi-elliptically-shaped springs 6000 may be fixed to the composite spring type segment 2000 by bolting, riveting, gluing, mechanical inter-spring interlocking, or any other relative fixing means. The fixing means is determined based on multidirectional mechanical stresses, thermal expansion, performance requirements, or any other relative factors. An example fixing means is shown in FIG. 13 including a locking hexnut 5000, flat washer 5100, and a bolt 5200. Each semi-elliptically-shaped springs 6000 is preferably fixed to the composite spring type segments 2000 with four bolts, but may be fixed with any amount. The twelve semi-elliptically-shaped springs 6000 are fixed to the composite spring type segments 2000 and spaced equally radially around the rim 2. Each composite spring type segment 2000 may preferably have four semi-elliptically-shaped springs 6000 fixed to the bottom surface 2160, but may be any amount. The four semi-elliptically-shaped springs 6000 are aligned in pairs and each pair is adjacently offset such that the semi-elliptical-shaped springs 6000 are placed in a staggered manner such that an extended end 2100 of the semi-elliptical-shaped springs 6000 aligns with a middle section 6100 of the adjacent semi-elliptical-shaped springs 6000. Preferably, the semi-elliptical-shaped springs 6000 are fixed to the spring type segments 2000 and adjacently offset such that the end of the extended end 2100 of the spring type segment 2000 aligns radially with the middle section 6100 of the fixed semi-elliptical-shaped springs 6000. This advantageously provides additional structural support at the extended end 2100 of the spring type segments 2000.

Figure 16:
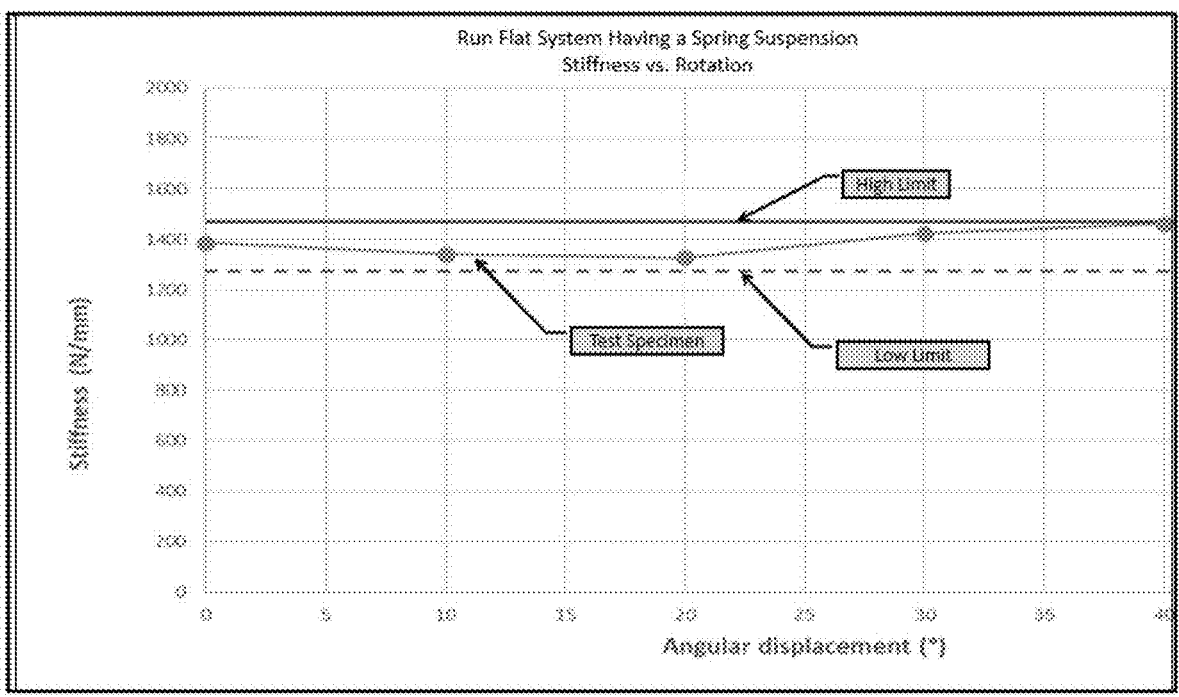
FIG. 16 is a graph displaying a run flat system having a spring suspension measuring stiffness versus rotation.

FIG. 16 illustrates a graph displaying stiffness versus rotation of the run flat system having a spring suspension. Stiffness is measured in N/mm and the angular displacement in degrees with a high and low limit set for stiffness.

Figure 17:
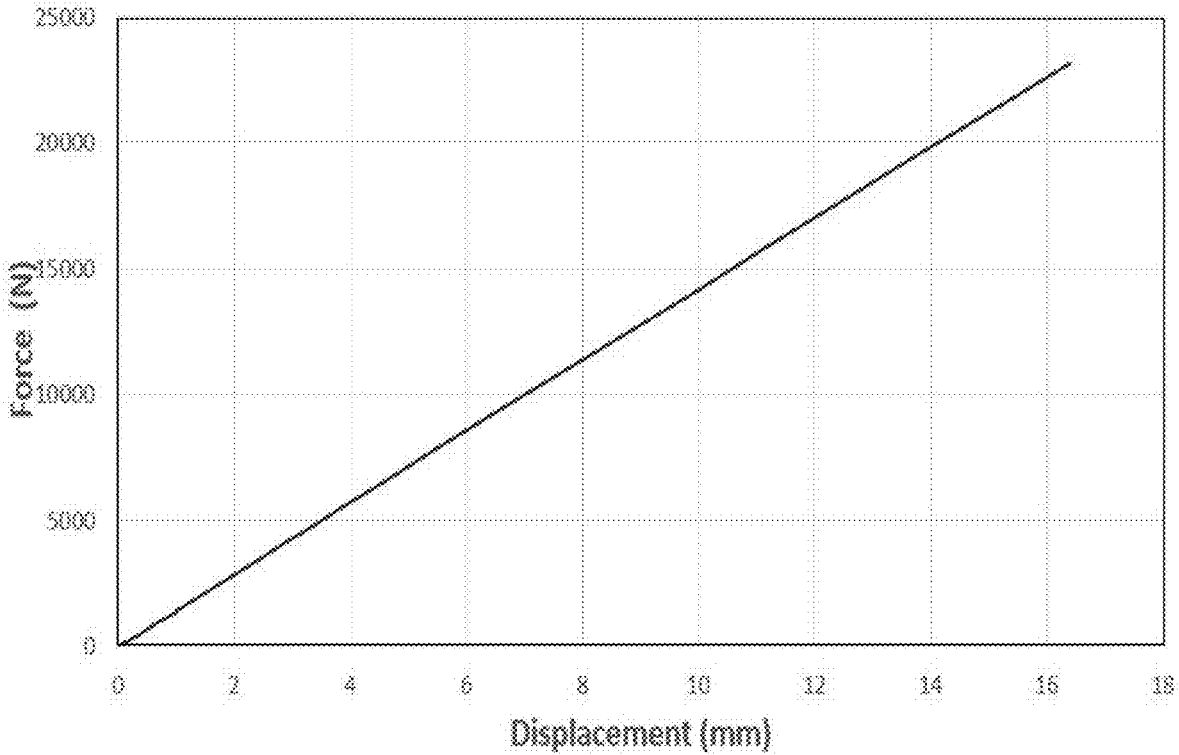
FIG. 17 is a graph displaying a run flat system having a spring suspension measuring force versus displacement.

FIG. 17 illustrates a graph displaying force versus displacement. Force is measured in N and Displacement in mm, while as force and mm increase the function is approximately linear.

To mount the flat-running device 1, according to one example of the preferred embodiment, the user advantageously proceeds in the following manner: the semi-elliptical-shaped springs 6000 are secured to the composite spring type segments 2000 by a connection member 4000 of the bolt type; these semi-elliptical-shaped springs 6000 are placed in a staggered manner such that an end 6200 of the semi-elliptical-shaped springs 6000 aligns with a middle section 6100 of the adjacent semi-elliptical-shaped springs 6000; the composite spring type segments 2000 are then inserted end-to-end and not connected together inside the tire casing 6; these composite spring type segments 2000 are placed facing one another inside the casing 6, both axially and radially as well as circumferentially such that the extended ends 2100 of each spring type segment 200 align adjacently; the composite spring type segments 2000 are connected together inside the casing 6 by assembling the connection member 4000 aligning the extended ends 2100 of the spring type segments 2000 and bolting the extended ends 2100 of the spring type segments 2000 with a semi-elliptical-shaped springs 6000; the flat-run device 1 thus assembled is made to slide over the axially inner surface of the rim bottom 14 of the rim 18.

Additionally, a lubricant may be applied to the rim 2 to lower the amount of potential friction between the annular supporting structure 100 and the rim 2 to reduce the amount of heat produced.

When the tire is in a flat state or a drop in inflating pressure inside the flat running device 1, the lack of air pressure causes the casing 6 to sag at the point of contact with the road and the inner surface of the casing 6 and outer surface 2140 of the composite spring type segment 2000 or annular supporting structure 100 to contact. Depending on the size of the tire, the surface area of contact between the inner surface of the casing 6 and outer surface 2140 of the composite spring type segment 2000 or annular supporting structure 100 may vary. Preferably the area of contact is between 5"and 7" long by 5" wide. When the tire is in a flat state or a drop in inflating pressure inside the flat running device 1 and rotation is occurring, the surface area may be approximately the length of the semi-elliptically-shaped spring 6000. Preferably, to evenly distribute the pressure distribution on the outer surface 2140 of the composite spring type segment 2000 or annular supporting structure 100, the use of two 2.5 inch wide semi-elliptically-shaped springs 6000 offset by 2.5 inches may be required. Therefore, an approximate linear deformation of the composite spring type segment 2000 occurs when placed under circumferential load due to the rotation of the tire. Therefore, there are discontinuities along the circumferential surface at the connection member 4000, when refereeing to load force. The surface discontinuities may be located at 120 degrees of circumference and are of an approximate length similar to the semi-elliptically-shaped springs 6000, being approximately 4-5 inches, and decrease in contacting area that is common with other known run flat designs.

The invention claimed is:

1. A run flat device configured to be fitted to a tubeless mounted wheel assembly for a motor vehicle, which comprises a wheel rim and a tire cover comprising beads mounted against edges of the rim, the run flat device comprising:

an annular supporting structure which is configured to be mounted around the rim so as to support the cover following a drop in inflating pressure inside the mounted wheel assembly, comprising:

at least one composite spring segment forming an arc of a circle assembled circumferentially around the rim forming the annular supporting structure; and an arrangement for locking the beads against the edges which are configured to connect the annular supporting structure to these beads;

wherein the composite spring segment further comprises a plurality of elliptical springs, shaped to be fixed to an inner surface of the composite spring segment.

2. The run flat of claim 1, wherein the annular supporting structure further comprises an end-to-end assembly of the composite spring segments allowing a uniform stress distribution in tension over the entire width of the run flat.

3. The run flat of claim 2, wherein the composite spring segment further comprises an extended end configured to attach to one of the plurality of elliptical springs for the end-to-end assembly.

4. The run flat of claim 3, wherein one of the plurality of elliptical springs are attached to two composite spring segments.

5. The run flat of claim 1, wherein the composite spring segment is in the form of a fully elastic spring without heat generation when cyclically deformed under the effect of a compressive load applied perpendicularly on an outer surface.

6. The run flat of claim 1, wherein the composite spring segment spans radially around the wheel in 120 degree segments and four elliptical springs are fixed to the bottom surface of the composite spring segment and the elliptical springs are arranged adjacently offset such that at least one of the four elliptical springs is at least partially outside radially of the 120 degree segment.

7. The run flat of claim 1, wherein the composite spring segment is constructed from continuous reinforcing filaments impregnated with thermosetting resin which allows varying mechanical strength as well as rigidity for a fixed geometry and sizing.

8. A run flat device configured to be fitted to a tubeless mounted wheel assembly for a motor vehicle, which comprises a wheel rim and a tire cover comprising beads mounted against edges of the rim, the run flat device comprising:

an annular supporting structure which is configured to be mounted around the rim so as to support the cover following a drop in inflating pressure inside the mounted wheel assembly, comprising:

at least one composite spring segment assembled circumferentially around the rim having at least one extended end;

at least one elliptical spring shaped for the incorporation of multiple at least one elliptical springs to be installed under the composite spring segment, such that the at least one composite spring segment is assembled circumferentially around the rim by fixing the extended end of the at least one composite spring segment to the at least one elliptical spring; and an arrangement for locking the beads against the edges which are configured to connect the annular supporting structure to these beads;

wherein the at least one elliptical spring is formed in tension and is compressed following a drop in inflating pressure inside the mounted assembly.

9. The run flat of claim 8, wherein the plurality of elliptical springs are formed in tension and contact one another when a drop in inflating pressure inside the mounted assembly occurs.

10. The run flat of claim 8, wherein the annular supporting structure further comprises an end-to-end assembly of the composite spring segments allowing a uniform stress distribution in tension over the entire width of the run flat.

11. The run flat of claim 8, wherein the extended end of the composite spring segment is configured to attach to one of the plurality of elliptical springs while a second extended end of a second composite spring segment is configured to attach to the elliptical springs.

12. The run flat of claim 8, wherein the composite spring segment is in the form of a fully elastic spring with reduced heat generation when cyclically deformed under the effect of a compressive load applied perpendicularly on an outer surface.

13. The run flat of claim 8, wherein the composite spring segment spans radially around the wheel in 120 degree segments and four elliptical springs are fixed to the bottom surface of the composite spring-segment and the elliptical springs are arranged adjacently offset such that at least one of the four elliptical springs is at least partially outside radially of the 120 degree segment.

14. The run flat of claim 8, wherein the composite spring is constructed from continuous reinforcing filaments impregnated with thermosetting resin which allows varying mechanical strength as well as rigidity for a fixed geometry and sizing.

15. A runflat device configured to be fitted around a wheel rim and within a tire cover, the runflat device comprising:

16 an annular supporting structure which is configured to be mounted around the wheel rim so as to support the tire cover following a drop in inflating pressure inside the mounted assembly comprising:

at least one composite spring element assembled circumferentially around the rim having at least one extended end;

a plurality of elliptical springs such that each of said at least one composite spring element is assembled circumferentially around a plurality of elastic springs by fixing said plurality of elliptical springs to a bottom surface of the composite structure; and wherein said plurality of elliptical springs are formed in tension and are compressed following a drop in inflating pressure inside the mounted assembly.

16. The run flat of claim 15, wherein the width of the at least one composite spring segment is double the width of the at least one elliptical spring.

17. The run flat of claim 15, wherein the composite spring segment spans radially around the wheel rim in 120 degree segments and four elliptical springs are fixed to the bottom surface of the composite spring segment and the elliptical springs are arranged adjacently offset such that at least one of the four elliptical springs is at least partially outside radially of the 120 degree segment.

18. The run flat of claim 17, wherein the extended end of the composite spring segment is configured to attach to one of the plurality of elliptical springs while a second extended end of a second composite spring segment is configured to attach to the elliptical springs.

19. The run flat of claim 15, wherein the extended end of the composite spring segment is configured to attach to one of the plurality of elliptical springs while a second extended end of a second composite spring segment is configured to attach to the elliptical springs.

\* \* \* \* \*